United States Patent
Takada et al.

(10) Patent No.: US 9,868,400 B2
(45) Date of Patent: Jan. 16, 2018

(54) IMAGE DISPLAY MIRROR FOR A VEHICLE

(71) Applicant: NITTO DENKO CORPORATION, Ibaraki-shi, Osaka (JP)

(72) Inventors: Katsunori Takada, Ibaraki (JP); Kentarou Takeda, Ibaraki (JP); Tadatoshi Nakanishi, Ibaraki (JP); Tadayuki Kameyama, Ibaraki (JP); Hiroki Kuramoto, Ibaraki (JP)

(73) Assignee: NITTO DENKO CORPORATION, Ibaraki-shi, Osaka (JP)

( * ) Notice: Subject to any disclaimer, the term of this patent is extended or adjusted under 35 U.S.C. 154(b) by 31 days.

(21) Appl. No.: 15/011,839

(22) Filed: Feb. 1, 2016

(65) Prior Publication Data

US 2016/0221507 A1    Aug. 4, 2016

(30) Foreign Application Priority Data

Feb. 2, 2015   (JP) .................. 2015-018657

(51) Int. Cl.
*G02F 1/1335* (2006.01)
*B60R 1/12* (2006.01)
(Continued)

(52) U.S. Cl.
CPC .............. *B60R 1/12* (2013.01); *G02B 27/144* (2013.01); *G02F 1/137* (2013.01); *G02F 1/1347* (2013.01);
(Continued)

(58) Field of Classification Search
CPC .... B60R 1/12; G02B 27/144; G02F 1/133528
(Continued)

(56) References Cited

U.S. PATENT DOCUMENTS 5,853,240 A * 12/1998 Tanaka ............... G02B 27/0172
                                                348/E5.141
6,020,867 A *  2/2000 Shimada .............. G02B 6/0086
                                                345/87
(Continued)

FOREIGN PATENT DOCUMENTS

JP        5273286 B1    8/2013
WO     03/079318 A1    9/2003
(Continued)

OTHER PUBLICATIONS

Extended European Search Report dated May 4, 2016, issued in counterpart European Application No. 16153591.9 (8 pages).

*Primary Examiner* — Lucy Chien
(74) *Attorney, Agent, or Firm* — Westerman, Hattori, Daniels & Adrian, LLP

(57) ABSTRACT

Provided is an image display mirror that includes a half mirror and an image display apparatus, reduces an influence of a reflected image provided by the half mirror, and is excellent in visibility of an image displayed on the image display apparatus. The image display mirror for a vehicle includes: a first polarizing plate; a first liquid crystal cell; a half mirror; and an image display apparatus in the stated order from a viewer side, in which in the first liquid crystal cell, a state in which a polarization direction of incident linearly polarized light is maintained and a state in which the incident linearly polarized light is transformed into circularly polarized light are switched in accordance with a voltage to be supplied.

9 Claims, 3 Drawing Sheets

(51) Int. Cl.
  *G02F 1/1347*  (2006.01)
  *G02B 27/14*  (2006.01)
  *G02F 1/137*  (2006.01)
  *G02F 1/31*  (2006.01)
  *G02F 1/13363*  (2006.01)

(52) U.S. Cl.
  CPC .... *G02F 1/13363* (2013.01); *G02F 1/133528* (2013.01); *G02F 1/31* (2013.01); *B60R 2001/1215* (2013.01); *G02F 2001/133557* (2013.01); *G02F 2001/133638* (2013.01)

(58) Field of Classification Search
  USPC .......................................................... 349/98
  See application file for complete search history.

(56) References Cited

U.S. PATENT DOCUMENTS

2006/0105814 A1  5/2006  Monden et al.
2014/0347488 A1  11/2014  Tazaki et al.

FOREIGN PATENT DOCUMENTS

WO  2005/050267 A1  6/2005
WO  2007/081318 A1  7/2007

\* cited by examiner

IMAGE DISPLAY MIRROR FOR A VEHICLE

This application claims priority under 35 U.S.C. Section 119 to Japanese Patent Application No. 2015-018657 filed on Feb. 2, 2015, which is herein incorporated by references.

BACKGROUND OF THE INVENTION

1. Field of the Invention

The present invention relates to an image display mirror for a vehicle.

2. Description of the Related Art

A technology involving combining a rear-view mirror for a vehicle with an image display apparatus to display an image has heretofore been known. For example, Japanese Patent No. 5273286 discloses an image display mirror including a half mirror arranged on the front surface (viewer side surface) of a monitor. In the image display mirror, the rear can be viewed with a reflected image provided by the half mirror. Meanwhile, when an image is displayed on the monitor, the image can be viewed through the half mirror.

Such image display mirror involves a problem in that, for example, when the quantity of light from the rear of a vehicle is large, the reflected image inhibits the visibility of an image displayed on the monitor. Japanese Patent No. 5273286 proposes the following technology. An influence of the reflected image is reduced by making the angle of the half mirror when a viewer (occupant) views the rear and the angle when the viewer views the image of the monitor different from each other. According to such technology, the influence of the reflected image provided by the half mirror can be reduced by adjusting the angle of the half mirror so that when the monitor image is viewed, the reflected image becomes an image that does not inhibit the visibility of the monitor image, specifically so that a ceiling is mirrored by reflection.

However, when it is difficult to turn the reflected image provided by the half mirror into the image that does not inhibit the visibility of the monitor image, e.g., when the image display mirror of Japanese Patent No. 5273286 is applied to a vehicle including a ceiling that transmits light, such as a panoramic roof or a sunroof, or a convertible car, the influence of the reflected image cannot be reduced by the mirror.

SUMMARY OF THE INVENTION

The present invention has been made to solve the conventional problems, and an object of the present invention is to provide an image display mirror that includes a half mirror and an image display apparatus, reduces an influence of a reflected image provided by the half mirror, and is excellent in visibility of an image displayed on the image display apparatus.

An image display mirror for a vehicle according to one embodiment of the present invention includes: a first polarizing plate; a first liquid crystal cell; a half mirror; and an image display apparatus in the stated order from a viewer side, in which in the first liquid crystal cell, a state in which a polarization direction of incident linearly polarized light is maintained and a state in which the incident linearly polarized light is transformed into circularly polarized light are switched in accordance with a voltage to be supplied.

In one embodiment of the present invention, when an image is not displayed on the image display apparatus, the first liquid crystal cell maintains a polarization direction of linearly polarized light entering from a first polarizing plate side; and when the image is displayed on the image display apparatus, the first liquid crystal cell transforms the linearly polarized light entering from the first polarizing plate side into circularly polarized light.

In one embodiment of the present invention, the first polarizing plate is subjected to a low-reflection treatment.

In one embodiment of the present invention, the image display mirror for a vehicle is configured so that light to be transmitted through the half mirror from a back surface side becomes circularly polarized light.

In one embodiment of the present invention, the image display mirror for a vehicle further includes a λ/4 plate on a viewer side of the first polarizing plate.

In one embodiment of the present invention, the half mirror and the image display apparatus are brought into close contact with each other by interlayer filling.

The image display mirror for a vehicle according to the embodiment of the present invention includes: a first polarizing plate; a first liquid crystal cell; a half mirror; and an image display apparatus in the stated order from a viewer side. In such image display mirror for a vehicle, an influence of a reflected image provided by the half mirror is reduced, and hence the visibility of an image displayed on the image display apparatus is excellent.

DETAILED DESCRIPTION OF THE PREFERRED EMBODIMENTS

Embodiments of the present invention are hereinafter described with reference to the drawings. However, the present invention is not limited to these embodiments.

A. Overall Configuration of Image Display Mirror for Vehicle

Figure 1:
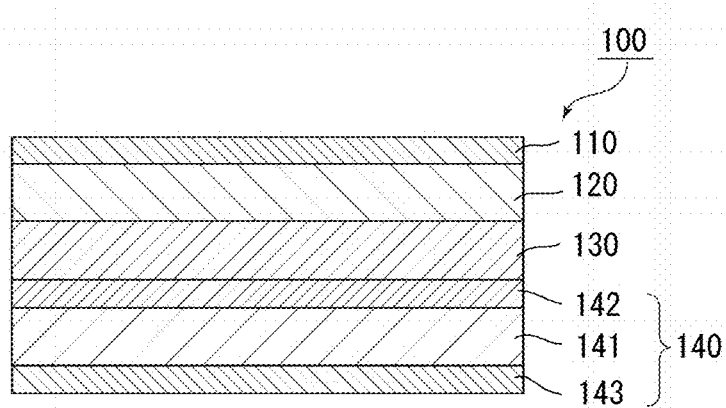
FIG. 1 is a schematic sectional view of an image display mirror according to one embodiment of the present invention.

FIG. 1 is a schematic sectional view of an image display mirror according to one embodiment of the present invention. An image display mirror 100 for a vehicle includes a first polarizing plate 110, a first liquid crystal cell 120, a half mirror 130, and an image display apparatus 140 in the stated order from a viewer side. The half mirror 130 and the image display apparatus 140 are preferably arranged so as to be parallel to each other. The image display mirror 100 for a vehicle of this embodiment can be used as, for example, the rear-view mirror (room mirror) of a vehicle. The half mirror 130 has a light-reflecting function and a light-transmitting function. The image display mirror 100 for a vehicle enables an occupant (more specifically, a driver) of the vehicle to observe the surroundings (e.g., the rear) of the vehicle by virtue of the light-reflecting function of the half mirror 130. In addition, in the image display mirror 100 for a vehicle, an image displayed on the image display apparatus 140 can be viewed by virtue of the light-transmitting function of the half mirror 130. The image display apparatus 140 displays, for example, an image provided by an external camera that mirrors the surroundings (e.g., the rear) of the vehicle. With such configuration, even, for example, when an obstacle (such as a passenger or baggage) is present in the vehicle and hence the surroundings of the vehicle cannot be sufficiently observed with the reflected image of the half mirror, the safety of the vehicle can be secured by displaying the image provided by the external camera on the image display apparatus. It should be noted that, although not illustrated, the image display mirror for a vehicle of the present invention may further include any appropriate other member.

In the first liquid crystal cell, a state in which the polarization direction of incident linearly polarized light is maintained and a state in which the incident linearly polarized light is transformed into circularly polarized light are switched in accordance with a voltage to be supplied. In one embodiment, the first liquid crystal cell maintains the polarization direction of the incident linearly polarized light when no voltage is applied, and transforms the incident linearly polarized light into the circularly polarized light when a voltage is applied. Details about the foregoing are described later. It should be noted that the phrase "maintains the polarization direction of the linearly polarized light" includes the case where the polarization direction is substantially maintained, and includes the case where the polarization direction changes by ±10° (preferably ±5°).

Figure 2A:
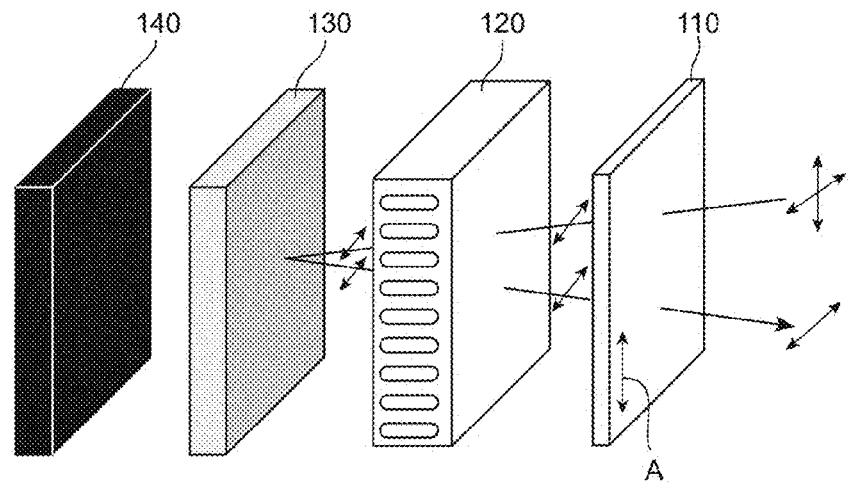
FIG. 2A and FIG. 2B are each a schematic view for illustrating an action according to the one embodiment of the present invention.
Figure 2B:
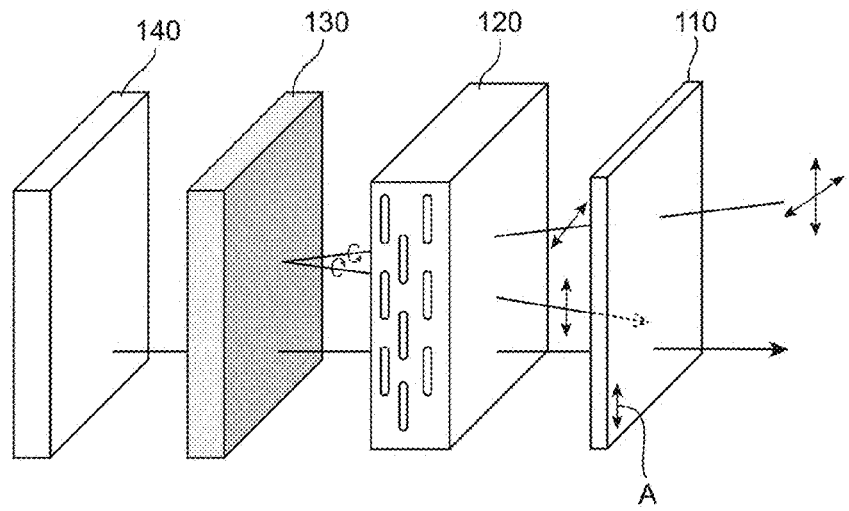

FIG. 2A and FIG. 2B are each a schematic view for illustrating an action according to the one embodiment of the present invention. FIG. 2A is an illustration of a state in which the image is not displayed on the image display apparatus 140 and hence the reflected image provided by the half mirror 130 is subjected to viewing. Under this state, the polarization direction of linearly polarized light generated by the transmission of light entering from the viewer side through the first polarizing plate 110 (polarized light whose polarization direction is perpendicular to an absorption axis A of the first polarizing plate) is maintained in the first liquid crystal cell 120. Accordingly, light reflected by the half mirror 130 can be transmitted through the first polarizing plate 110 again, and hence the occupant of the vehicle can view the reflected image provided by the half mirror. FIG. 2B is an illustration of a state in which the image is displayed on the image display apparatus 140. Under this state, the first liquid crystal cell 120 transforms the linearly polarized light entering from the first polarizing plate 110 side into circularly polarized light. Under this state, (i) the light entering from the viewer side is transmitted through the first polarizing plate and the first liquid crystal cell to become right- or left-handed circularly polarized light, (ii) the circularly polarized light is reflected by the half mirror to become circularly polarized light opposite-handed to that at the time of the incidence, and (iii) the opposite-handed circularly polarized light is transformed into linearly polarized light that cannot be transmitted through the first polarizing plate 110 in the first liquid crystal cell 120. As a result, the reflected image provided by the half mirror becomes difficult to view. On the other hand, light from the image display apparatus that has been transmitted through the half mirror can be transmitted through the first liquid crystal cell and the first polarizing plate, and hence the image displayed on the image display apparatus is subjected to the viewing. As described above, according to the image display mirror for a vehicle of the present invention, an influence of the reflected image provided by the half mirror is reduced, and hence the visibility of the image displayed on the image display apparatus can be improved.

In the image display mirror, adjacent members (the image display apparatus, the half mirror, the first liquid crystal cell, the first polarizing plate, and any other member to be arranged as required) may be in contact with each other, or may be out of contact with each other. It is preferred that a gap between respective members be filled with a transparent resin, and both the members be in close contact with each other. When both the members are brought into close contact with each other as described above, an image display mirror for a vehicle excellent in efficiency with which light is utilized and excellent in visibility of a displayed image can be obtained. Any appropriate resin film, pressure-sensitive adhesive, or the like may be used in interlayer filling. A pressure-sensitive adhesive excellent in transparency is preferably used as the pressure-sensitive adhesive. Examples thereof include an acrylic pressure-sensitive adhesive, a silicone-based pressure-sensitive adhesive, and a rubber-based pressure-sensitive adhesive.

B. First Polarizing Plate

The first polarizing plate has a first polarizer, and as required, further has a protective layer arranged on one side, or each of both sides, of the first polarizer. The polarizer is typically an absorption-type polarizer.

The transmittance (also referred to as "single axis transmittance") of the polarizer at a wavelength of 589 nm is preferably 41% or more, more preferably 42% or more. It should be noted that a theoretical upper limit for the single axis transmittance is 50%. In addition, its polarization degree is preferably from 99.5% to 100%, more preferably from 99.9% to 100%.

Any appropriate polarizer may be used as the polarizer. Examples thereof include: a polarizer obtained by adsorbing a dichroic substance, such as iodine or a dichroic dye, onto a hydrophilic polymer film, such as a polyvinyl alcohol-based film, a partially formalized polyvinyl alcohol-based film, or an ethylene-vinyl acetate copolymer-based partially saponified film, and subjecting the resultant film to uniaxial stretching; and polyene-based alignment films, such as a dehydrated product of polyvinyl alcohol and a dehydrochlorinated product of polyvinyl chloride. Of those, a polarizer obtained by adsorbing a dichroic substance, such as iodine, onto a polyvinyl alcohol-based film and subjecting the resultant film to uniaxial stretching is particularly preferred because of its high polarized dichromaticity. The polarizer has a thickness of preferably from 0.5 µm to 80 µm.

The polarizer obtained by adsorbing iodine onto a polyvinyl alcohol-based film and subjecting the resultant film to uniaxial stretching is typically produced by dyeing polyvinyl alcohol through immersion in an aqueous solution of iodine and stretching the resultant film at a ratio of from 3 times to 7 times with respect to its original length. The stretching may be carried out after the dyeing, the stretching may be carried out during the dyeing, or the stretching may be carried out before the dyeing. The polarizer may be produced by subjecting the film to treatments such as swelling, cross-linking, adjusting, washing with water, and drying in addition to the stretching and the dyeing.

Any appropriate film may be used as the protective layer. As a material for the main component of such film, there are specifically given, for example: cellulose-based resins, such as triacetylcellulose (TAC); and transparent resins, such as (meth)acrylic, polyester-based, polyvinyl alcohol-based, polycarbonate-based, polyamide-based, polyimide-based, polyether sulfone-based, polysulfone-based, polystyrene-based, polynorbornene-based, polyolefin-based, or acetate-based transparent resins. In addition, examples thereof further include thermosetting resins and UV curable resins, such as acrylic, urethane-based, acrylic urethane-based, epoxy-based, or silicone-based thermosetting resins and UV curable resins. In addition, examples thereof further include glassy polymers, such as a siloxane-based polymer. In addition, a polymer film described in Japanese Patent Application Laid-open No. 2001-343529 (International Patent WO01/37007A) may also be used. For example, a resin composition containing a thermoplastic resin having in its side chain a substituted or unsubstituted imide group and a thermoplastic resin having in its side chain a substituted or unsubstituted phenyl group and a nitrile group may be used as a material for the film. An example thereof is a resin composition containing an alternating copolymer formed of isobutene and N-methylmaleimide and an acrylonitrile-styrene copolymer. The polymer film may be, for example, an extruded product of the resin composition.

In one embodiment, the first polarizing plate is subjected to a low-reflection treatment. The surface of the protective layer is preferably subjected to the low-reflection treatment. The low-reflection treatment is, for example, a treatment involving forming a layer, such as a fluorine-based resin layer, a multilayer metal-deposited layer, an optical interference layer, or a layer having a fine uneven shape (e.g., a moth-eye structure).

C. First Liquid Crystal Cell

The first liquid crystal cell typically has a pair of substrates including electrodes and a liquid crystal layer serving as a display medium sandwiched between the substrates.

The liquid crystal layer (resultantly the first liquid crystal cell) can function as a $\lambda/4$ plate when a voltage is applied or when no voltage is applied. A front retardation $R_0$ of the liquid crystal layer at a wavelength of 590 nm when the layer functions as the $\lambda/4$ plate is from 90 nm to 190 nm, preferably from 100 nm to 180 nm, more preferably from 110 nm to 170 nm. It should be noted that the front retardation $R_0$ as used herein is determined from the equation "$R_0=(nx-ny)\times d$" where nx represents a refractive index in the direction in which an in-plane refractive index becomes maximum (i.e., a slow axis direction), ny represents a refractive index in a direction perpendicular to the slow axis in a plane (i.e., a fast axis direction), and d (nm) represents the thickness of the liquid crystal layer, the parameters being values under 23° C. The liquid crystal layer when the layer functions as the $\lambda/4$ plate shows any appropriate refractive index ellipsoid as long as the layer has the relationship of nx>ny.

The angle between the absorption axis of the polarizer of the first polarizing plate and the slow axis of the liquid crystal layer when the layer functions as the $\lambda/4$ plate is preferably from +40° to +50° or from −40° to −50°, more preferably from +43° to +47° or from −43° to −47°, still more preferably +45° or −45°. When the liquid crystal layer capable of functioning as the $\lambda/4$ plate and the first polarizing plate are arranged so as to satisfy such relationship, incident linearly polarized light can be transformed into circularly polarized light in the first liquid crystal cell.

In one embodiment, the liquid crystal layer contains liquid crystal molecules aligned in a homeotropic array under a state in which no electric field is present. A driving mode using the liquid crystal molecules aligned in the homeotropic array under a state in which no electric field is present is, for example, a vertical alignment (VA) mode.

Figure 3A:
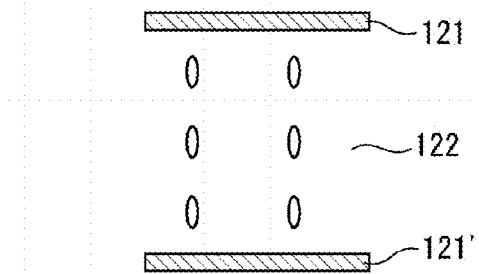
FIG. 3A and FIG. 3B are each a schematic sectional view for illustrating an aligned state of liquid crystal molecules in a VA mode.
Figure 3B:
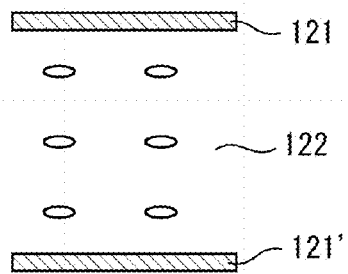

FIG. 3A and FIG. 3B are each a schematic sectional view for illustrating an aligned state of the liquid crystal molecules in the VA mode. As illustrated in FIG. 3A, when no voltage is applied, the liquid crystal molecules in the VA mode are aligned so as to be substantially vertical (in a normal direction) to the surfaces of substrates 121 and 121'. Herein, the expression "substantially vertical" includes the case where the alignment vectors of the liquid crystal molecules tilt relative to the normal direction, i.e., the case where the liquid crystal molecules each have a tilt angle. The tilt angle (angle from the normal) is preferably 10° or less, more preferably 5° or less, particularly preferably 1° or less. Such substantially vertical alignment can be realized by, for example, arranging nematic liquid crystal having negative dielectric constant anisotropy between substrates having formed thereon vertical alignment films. When light is caused to enter from the surface of one of the substrates under such state, linearly polarized light that has passed the first polarizing plate to enter a liquid crystal layer 122 travels along the direction of the long axis of each of the liquid crystal molecules aligned in a substantially vertical manner. The incident light travels without changing its polarization direction because substantially no birefringence occurs in the long axis direction of each of the liquid crystal molecules. When a voltage is applied between the electrodes, the long axes of the liquid crystal molecules are aligned so as to be parallel to the substrate surfaces. Each of the liquid crystal molecules in this state shows birefringence for the linearly polarized light that has passed the first polarizing plate to enter the liquid crystal layer 122, thereby expressing a retardation as described above.

The mode of the liquid crystal layer is not limited to the VA mode, and any appropriate liquid crystal layer may be used as long as the liquid crystal layer is such that a state in which the layer can function as a $\lambda/4$ plate and a state in which the layer is substantially free from expressing a front retardation (maintains a polarization direction) can be switched in accordance with a voltage to be supplied. In addition, not only a liquid crystal layer capable of functioning as a $\lambda/4$ plate when a voltage is applied but also a liquid crystal layer capable of functioning as a $\lambda/4$ plate when no voltage is applied, and substantially free from expressing a retardation when a voltage is applied may be used.

D. Half Mirror

Any appropriate mirror may be used as the half mirror as long as the mirror can transmit part of incident light and reflect other part thereof. Examples thereof include: a half mirror including a transparent base material and a metal thin film formed on the transparent base material; and a half mirror including a transparent base material and a dielectric multilayer film formed on the transparent base material. The half mirror is preferably free of a polarization function from the viewpoint that the effects of the present invention are efficiently obtained.

Any appropriate material may be used as a material for constituting the transparent base material. Examples of the material include: transparent resin materials, such as polymethyl methacrylate, polycarbonate, and an epoxy resin; and glass. The thickness of the transparent base material is, for example, from 20 µm to 5,000 µm. The transparent base material is preferably free of a retardation.

A metal having a highlight reflectance can be used as a material for constituting the metal thin film, and examples thereof include aluminum, silver, and tin. The metal thin film can be formed by, for example, plating or vapor deposition. The thickness of the metal thin film is, for example, from 2 nm to 80 nm, preferably from 3 nm to 50 nm.

In the dielectric multilayer film, a high-refractive index material and a low-refractive index material each having a predetermined thickness are laminated so that the film has a function as a mirror. The high-refractive index material and the low-refractive index material are preferably laminated in an alternate manner, and the function as the half mirror is expressed by utilizing the interference of light beams occurring upon their incidence from the low-refractive index material to the high-refractive index material. The half mirror including the dielectric multilayer film is preferred because its absorption of light is reduced.

The high-refractive index material has a refractive index of preferably more than 2.0, more preferably more than 2.0 and 3.0 or less. Specific examples of the high-refractive index material include $ZnS$—$SiO_2$, $TiO_2$, $ZrO_2$, and $Ta_2O_3$. The low-refractive index material has a refractive index of preferably from 1.2 to 2.0, more preferably from 1.4 to 1.9. Specific examples of the low-refractive index material include $SiO_2$, $Al_2O_3$, and MgF.

The visible light reflectance of the half mirror is preferably from 20% to 80%, more preferably from 30% to 70%, still more preferably from 40% to 60%. In addition, the visible light transmittance of the half mirror is preferably from 20% to 80%, more preferably from 30% to 70%, still more preferably from 40% to 60%. The visible light reflectance, the visible light transmittance, and a ratio therebetween (described later) can be adjusted by controlling the thickness of the metal thin film or the dielectric multilayer film.

The ratio between the visible light reflectance and visible light transmittance of the half mirror (reflectance:transmittance) is preferably from 2:8 to 8:2, more preferably from 3:7 to 7:3, still more preferably from 4:6 to 6:4. The ratio between the visible light reflectance and the visible light transmittance can be appropriately adjusted in accordance with, for example, the brightness of the image display apparatus.

E. Image Display Apparatus

Any appropriate apparatus may be used as the image display apparatus. Examples thereof include a liquid crystal display apparatus, an organic EL display apparatus, and a plasma display apparatus. Description is given below by taking the liquid crystal display apparatus as a typical example. In one embodiment, as the liquid crystal display apparatus, there is used an image display apparatus including, as illustrated in FIG. 1, a liquid crystal panel including a second liquid crystal cell 141, a second polarizing plate 142 arranged on the viewer side of the second liquid crystal cell 141, and a third polarizing plate 143 arranged on the back surface side of the liquid crystal cell 141. It should be noted that, although not illustrated, the image display apparatus may include any appropriate other member (such as a backlight unit) as required. In this embodiment, the second polarizing plate and the third polarizing plate can be placed so that the absorption axes of their respective polarizers are substantially perpendicular or parallel to each other to enable the viewing of an image.

E-1. Second Liquid Crystal Cell

The second liquid crystal cell has a pair of substrates and a liquid crystal layer serving as a display medium sandwiched between the substrates. In a general configuration, a color filter and a black matrix are arranged on one of the substrates, and a switching element for controlling the electrooptical characteristics of liquid crystal, a scanning line for providing the switching element with a gate signal and a signal line for providing the element with a source signal, and a pixel electrode and a counter electrode are arranged on the other substrate. An interval between the substrates (cell gap) can be controlled with, for example, a spacer. For example, an alignment film formed of polyimide can be arranged on the side of each of the substrates to be brought into contact with the liquid crystal layer.

In one embodiment, the liquid crystal layer in the second liquid crystal cell contains liquid crystal molecules aligned in a homogeneous array under a state in which no electric field is present. Such liquid crystal layer (resultantly the liquid crystal cell) typically shows a three-dimensional refractive index of $nx>ny=nz$. It should be noted that the expression "$ny=nz$" as used herein includes not only the case where ny and nz are completely equal to each other but also the case where ny and nz are substantially equal to each other. Typical examples of a driving mode using the liquid crystal layer showing such three-dimensional refractive index include an in-plane switching (IPS) mode and a fringe field switching (FFS) mode. It should be noted that the IPS mode includes a super in-plane switching (S-IPS) mode and an advanced super in-plane switching (AS-IPS) mode each adopting a V-shaped electrode, a zigzag electrode, or the like. In addition, the FFS mode includes an advanced fringe field switching (A-FFS) mode and an ultra fringe field switching (U-FFS) mode each adopting a V-shaped electrode, a zigzag electrode, or the like.

In another embodiment, the liquid crystal layer in the second liquid crystal cell contains liquid crystal molecules aligned in a homeotropic array under a state in which no electric field is present. Such liquid crystal layer (resultantly the liquid crystal cell) typically shows a three-dimensional refractive index of $nz>nx=ny$. A driving mode using the liquid crystal molecules aligned in the homeotropic array under a state in which no electric field is present is, for example, a vertical alignment (VA) mode. The VA mode includes a multi-domain VA (MVA) mode.

E-2. Second Polarizing Plate and Third Polarizing Plate

Such polarizing plate as described in the section B is used as each of the second polarizing plate and the third polarizing plate. That is, the second polarizing plate can have a second polarizer and the third polarizing plate can have a third polarizer.

F. Other Members

F-1. Fourth Polarizer and First λ/4 Plate

In one embodiment, the image display mirror for a vehicle of the present invention is configured so that light to be transmitted through the half mirror from a back surface side becomes circularly polarized light. With such configuration, when the image is displayed on the image display apparatus, i.e., when the first liquid crystal cell functions as a λ/4 plate, the circularly polarized light transmitted through the half mirror enters the first liquid crystal cell to be transformed into linearly polarized light, and the linearly polarized light can be transmitted through the first polarizing plate. Accordingly, the efficiency with which light output from the image display apparatus is utilized can be improved. The configuration of this embodiment is, for example, a configuration in which a first λ/4 plate and a fourth polarizer are further arranged in the stated order from the viewer side between the half mirror and the image display apparatus. Such configuration is preferably adopted when an image display apparatus that does not output linearly polarized light (such as an organic EL display apparatus) is used. Also permitted is a configuration in which the first λ/4 plate is arranged between the half mirror and the image display apparatus, and the polarizer is not arranged. Such configuration is preferably adopted when an image display apparatus that outputs linearly polarized light (such as a liquid crystal display apparatus) is used.

The polarizer described in the section B can be used as the fourth polarizer.

A front retardation $R_0$ of the λ/4 plate at a wavelength of 590 nm is from 90 nm to 190 nm, preferably from 100 nm to 180 nm, more preferably from 110 nm to 170 nm.

Any appropriate material may be used as a material for constituting the λ/4 plate as long as the effects of the present invention are obtained. A typical example thereof is a stretched film of a polymer film. Examples of a resin for forming the polymer film include a polycarbonate-based resin and a cycloolefin-based resin. A method of producing the λ/4 plate is not particularly limited, but the λ/4 plate can be obtained by, for example, stretching the polymer film at a temperature of from about 100° C. to about 250° C. and at a stretching ratio of from about 1.1 times to about 2.5 times. The front retardation and thickness direction retardation of the λ/4 plate can be controlled by adjusting the stretching ratio and stretching temperature of the polymer film. The thickness and total light transmittance of the λ/4 plate are preferably about 200 μm or less and 80% or more, respectively, though the thickness and the total light transmittance are not particularly limited thereto.

An angle between the absorption axis of the fourth polarizer and the slow axis of the first λ/4 plate is preferably from +40° to +50° or from −40° to −50°, more preferably from +43° to +47° or from −43° to −47°, still more preferably +45° or −45°.

F-2. Second λ/4 Plate

In one embodiment, a second λ/4 plate is arranged on the viewer side of the first polarizing plate. The arrangement of the second λ/4 plate can provide an image display mirror for a vehicle excellent in visibility for a user of a pair of polarized sunglasses. It should be noted that the second λ/4 plate may be in contact with the first polarizing plate or may be out of contact therewith. In addition, the second λ/4 plate and the first polarizing plate may be bonded to each other through intermediation of pressure-sensitive adhesive layer. Further, the second λ/4 plate may be arranged attachably and removably. The λ/4 plate described in the section F-1 can be used as the second λ/4 plate. An angle between the absorption axis of the first polarizer of the first polarizing plate and the slow axis of the second λ/4 plate is preferably from +40° to +50° or from −40° to −50°, more preferably from +43° to +47° or from −43° to −47°, still more preferably +45° or −45°.

What is claimed is:

1. An image display mirror for a vehicle, comprising:
 a first polarizing plate;
 a first liquid crystal cell;
 a half mirror; and
 an image display apparatus in the stated order from a viewer side,
 wherein the first liquid crystal cell is configured to switch, in accordance with a voltage to be applied, between a first state in which a polarization direction of incident linearly polarized light is maintained and a second state in which the incident linearly polarized light is transformed into circularly polarized light.

2. The image display mirror for a vehicle according to claim 1, wherein:
 when an image is not displayed on the image display apparatus, the first liquid crystal cell is configured to maintain the polarization direction of the linearly polarized light entering from a first polarizing plate side; and
 when the image is displayed on the image display apparatus, the first liquid crystal cell is configured to transform the linearly polarized light entering from the first polarizing plate side into the circularly polarized light.

3. The image display mirror for a vehicle according to claim 1, wherein the first polarizing plate is subjected to a low-reflection treatment.

4. The image display mirror for a vehicle according to claim 1, wherein the image display mirror is configured so that light to be transmitted through the half mirror from a back surface side becomes circularly polarized light.

5. The image display mirror for a vehicle according claim 1, further comprising a λ/4 plate on a viewer side of the first polarizing plate.

6. The image display mirror for a vehicle according to claim 1, wherein the half mirror and the image display apparatus are brought into close contact with each other by interlayer filling.

7. The image display mirror for a vehicle according to claim 1,
 wherein the first liquid crystal cell comprises a liquid crystal layer, and
 wherein the liquid crystal layer is configured to switch, in accordance with the voltage to be applied, between a first state in which the liquid crystal layer is configured to function as a λ/4 plate so that a front retardation of the liquid crystal layer at a wavelength of 590 nm is 90 nm to 190 nm, and a second state in which the liquid crystal layer is configured to maintain the polarization direction of incident linearly polarized light.

8. The image display mirror for a vehicle according to claim 1,
 wherein the first polarizing plate comprises a polarizer, and the first liquid crystal cell comprises a liquid crystal layer that is configured to function as a λ/4 plate in accordance with the voltage to be applied, so that an angle between an absorption axis of the polarizer and a slow axis of the liquid crystal layer when the liquid crystal layer functions as the λ/4 plate is from +40° to +50°, or from −40° to −50°.

9. The image display mirror for a vehicle according to claim 1, wherein the image display apparatus comprises a second polarizing plate, a second liquid crystal cell, and a third polarizing plate in the stated order from the viewer side.

* * * * *